March 18, 1958   A. R. LINDSAY   2,827,327
SELF-SUPPORTING BODIES FOR AUTOMOBILES
Filed May 27, 1948   8 Sheets-Sheet 1

INVENTOR.
Alexander R. Lindsay
BY *Maurice G. Crews*
ATTORNEY

March 18, 1958    A. R. LINDSAY    2,827,327
SELF-SUPPORTING BODIES FOR AUTOMOBILES
Filed May 27, 1948    8 Sheets-Sheet 2

INVENTOR.
Alexander R. Lindsay
BY Maurice A. Crews
ATTORNEY

March 18, 1958     A. R. LINDSAY     2,827,327
SELF-SUPPORTING BODIES FOR AUTOMOBILES Filed May 27, 1948     8 Sheets-Sheet 3

INVENTOR.
Alexander R. Lindsay
BY *Maurice G. Crews*
ATTORNEY

March 18, 1958 — A. R. LINDSAY — 2,827,327
SELF-SUPPORTING BODIES FOR AUTOMOBILES
Filed May 27, 1948 — 8 Sheets-Sheet 4

INVENTOR
Alexander R. Lindsay
BY
Maurice Q. Cross
ATTORNEY

March 18, 1958      A. R. LINDSAY      2,827,327
SELF-SUPPORTING BODIES FOR AUTOMOBILES Filed May 27, 1948      8 Sheets-Sheet 5

INVENTOR.
Alexander R. Lindsay
BY *Maurice G. Crews*
ATTORNEY

March 18, 1958 A. R. LINDSAY 2,827,327
SELF-SUPPORTING BODIES FOR AUTOMOBILES
Filed May 27, 1948 8 Sheets-Sheet 6
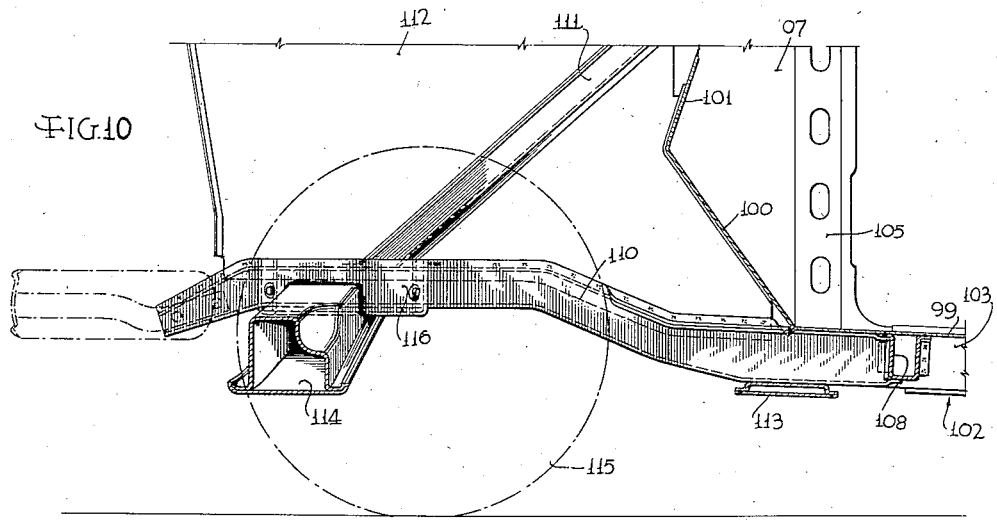
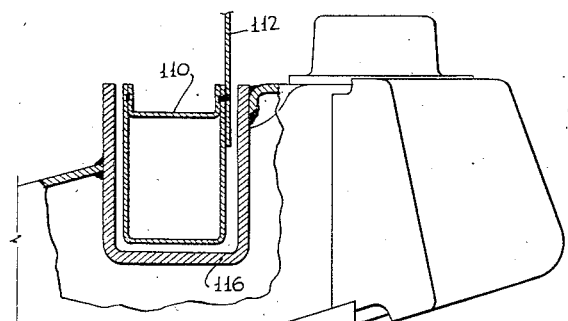
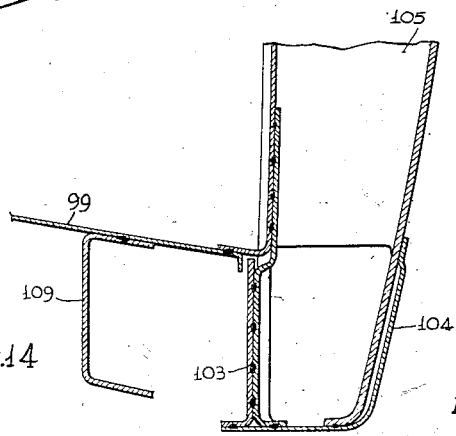
INVENTOR.
Alexander R. Lindsay
BY Maurice A. Crews
ATTORNEY

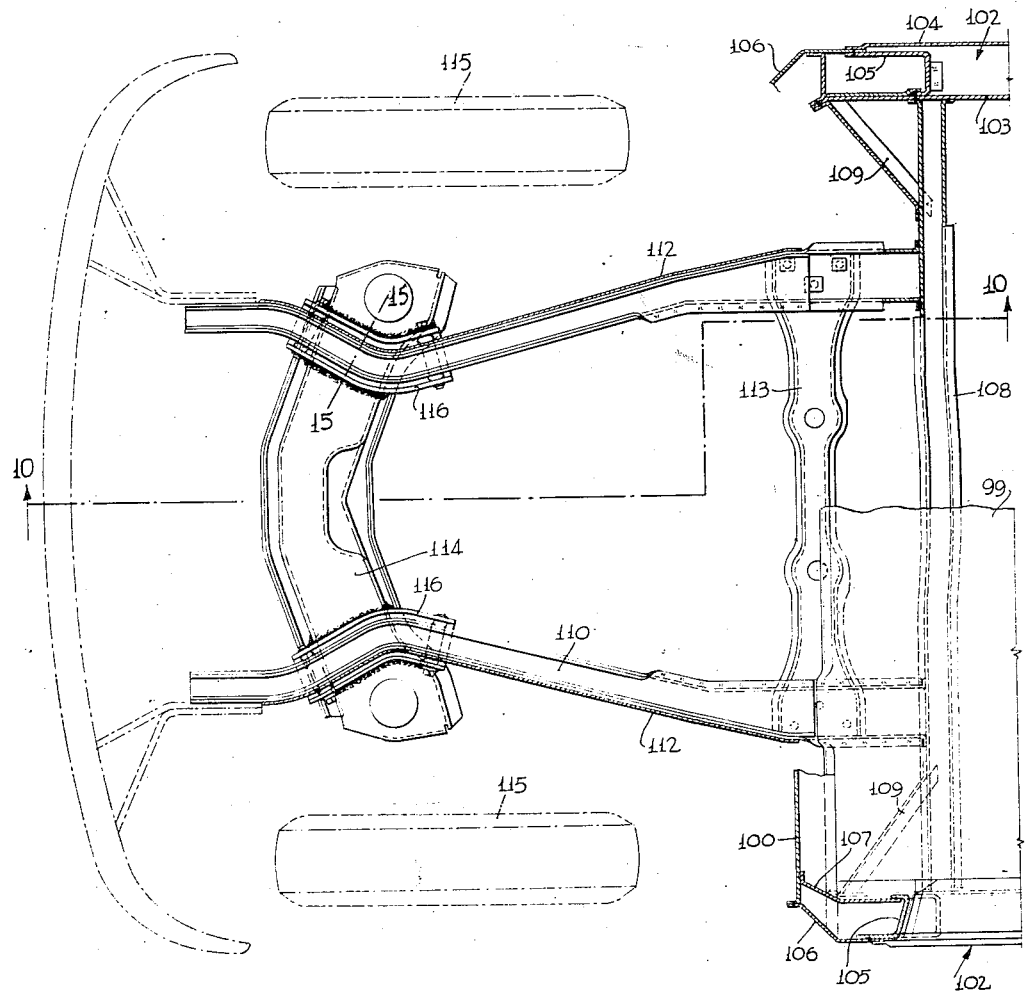

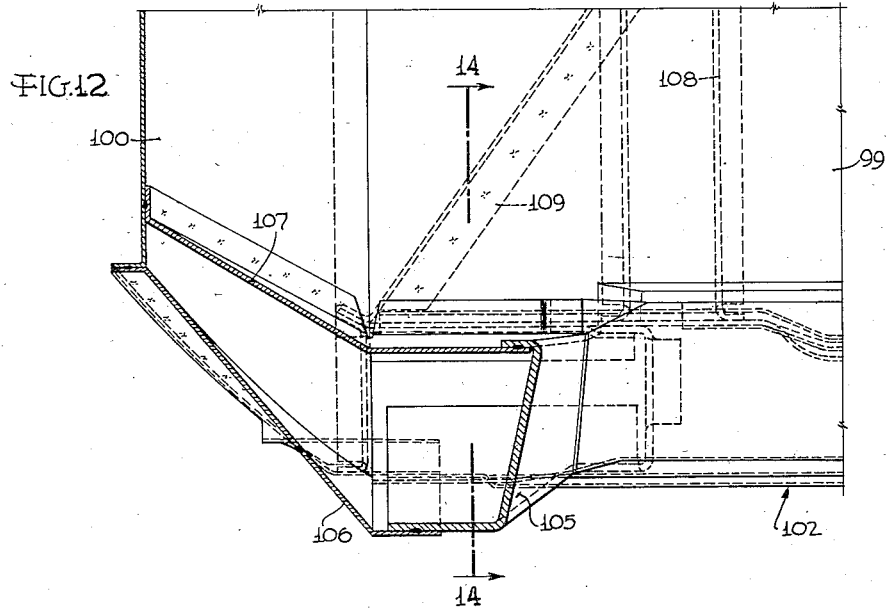
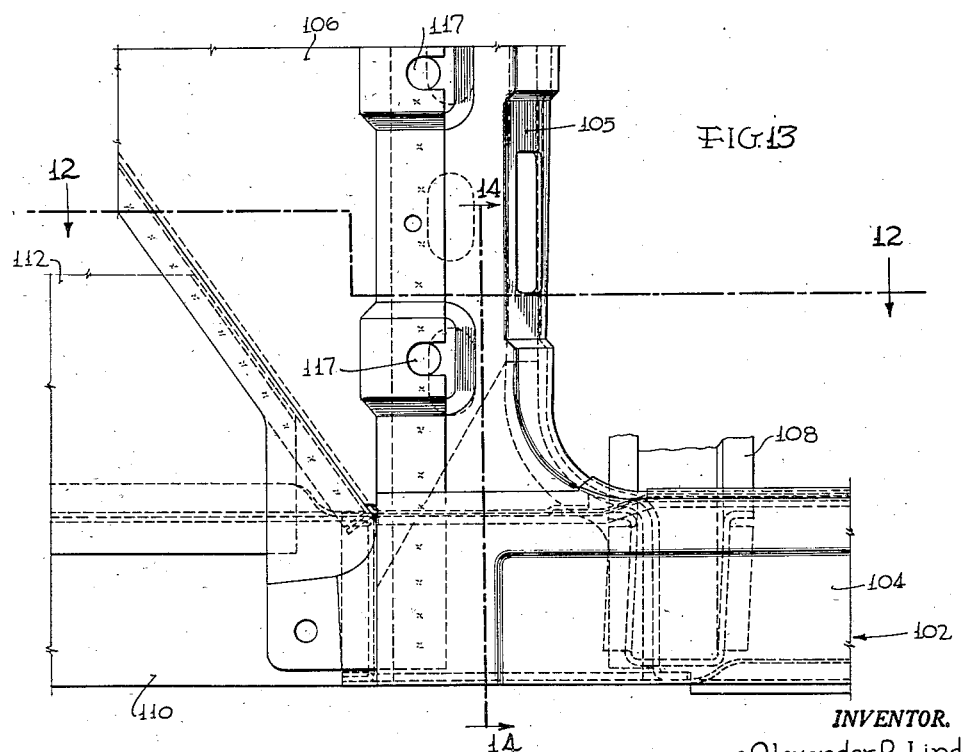

United States Patent Office 2,827,327
Patented Mar. 18, 1958

2,827,327

SELF-SUPPORTING BODIES FOR AUTOMOBILES

Alexander R. Lindsay, Detroit, Mich., assignor to The Budd Company, Philadelphia, Pa., a corporation of Pennsylvania Application May 27, 1948, Serial No. 29,458

2 Claims. (Cl. 296—28)

The invention relates to the construction of self-supporting bodies for automobiles, especially pleasure-type cars. More particularly, the invention relates to the front end and threshold construction of such bodies.

Among the objects of the invention are improvement of the design and construction in the forward and threshold regions.

A more specific object of the invention is to overcome difficulties encountered in the arrangement and construction of thresholds and sills for bodies which have great width relative to the tread of the wheels.

A still further object of the invention is a body having great ground clearance and lightness of weight.

A still further object of the invention is a body construction composed of a main body assembly ending at the dashboard, and a forward body unit or units attached to the main unit in final assembly, thereby permitting the use of the assembly lines hitherto employed for the assembly of bodies to be placed on separate chassis, and the saving of shipping space.

The aforesaid objects of the invention are achieved mainly by a new arrangement and design of the body side or threshold sills, of forward sill extensions connected with the front wheels and supporting the driving unit, and of means for bracing the sill extensions against the remainder of the body.

A more complete picture of the objects, advantages and features of the invention will be gained from the embodiments illustrated in the attached drawings and from the following detailed description of such embodiments.

In the drawings,

Figures 8 and 9 are fragmentary sections through the lower body side margin along the correspondingly numbered lines of Figure 1;

Figure 10 is a fragmentary inside elevation and a section approximately along line 10—10 of Figure 11 of the front end of an automobile representing a third embodiment of the invention;

Figure 11 is a fragmentary plan view of the body front end shown in Figure 10, certain parts being shown in section taken at different levels;

Figure 12 is a fragmentary horizontal section corresponding to the section through the left-hand front body corner of Figure 11 but being on a larger scale and showing more details than Figure 11, the section also being taken along line 12—12 of Figure 13;

Figure 13 is a fragmentary side elevation of the lower end of the left-hand front post and adjoining body members;

Figure 1:
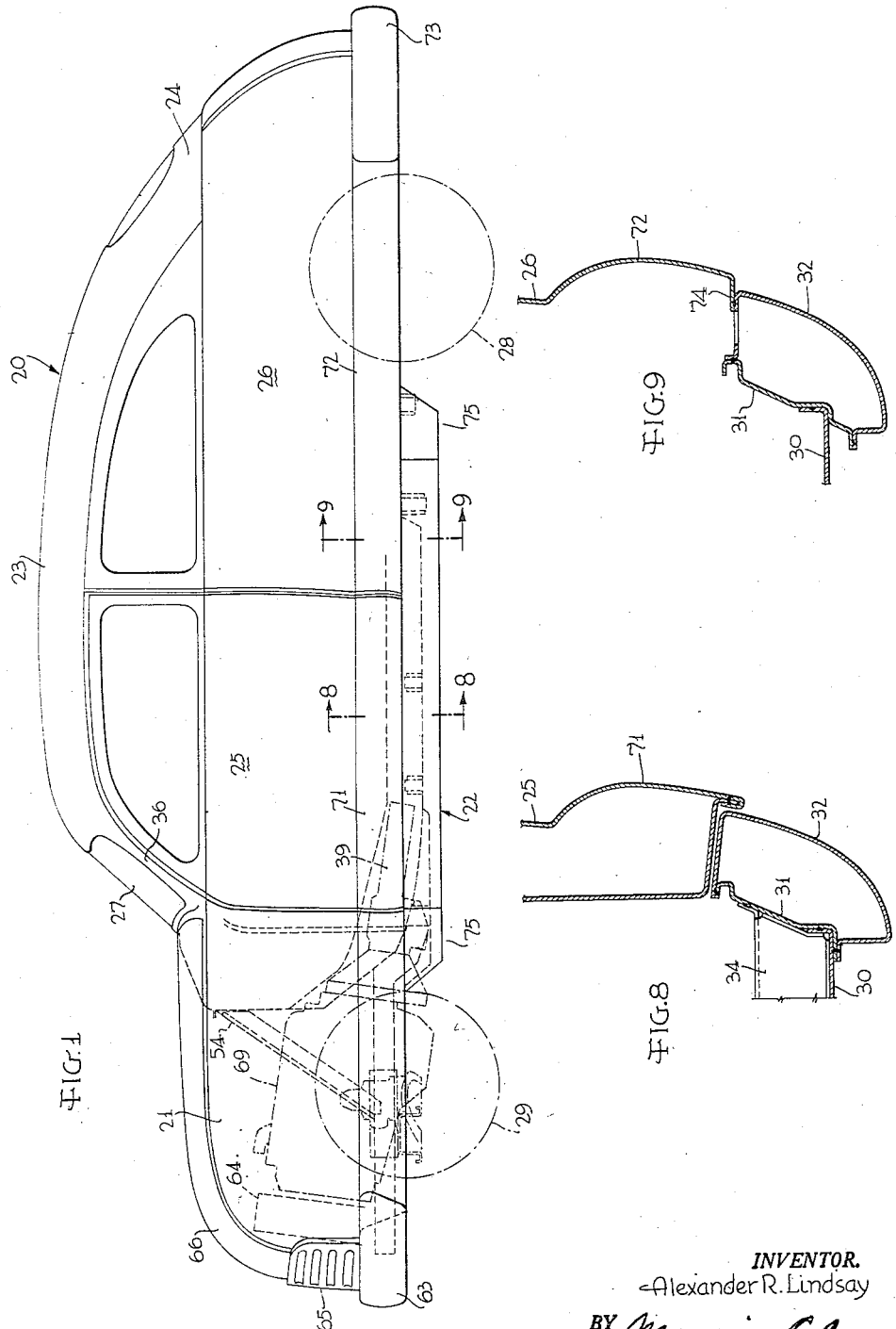
Figure 1 is a side elevation of an automobile.
Figure 2:
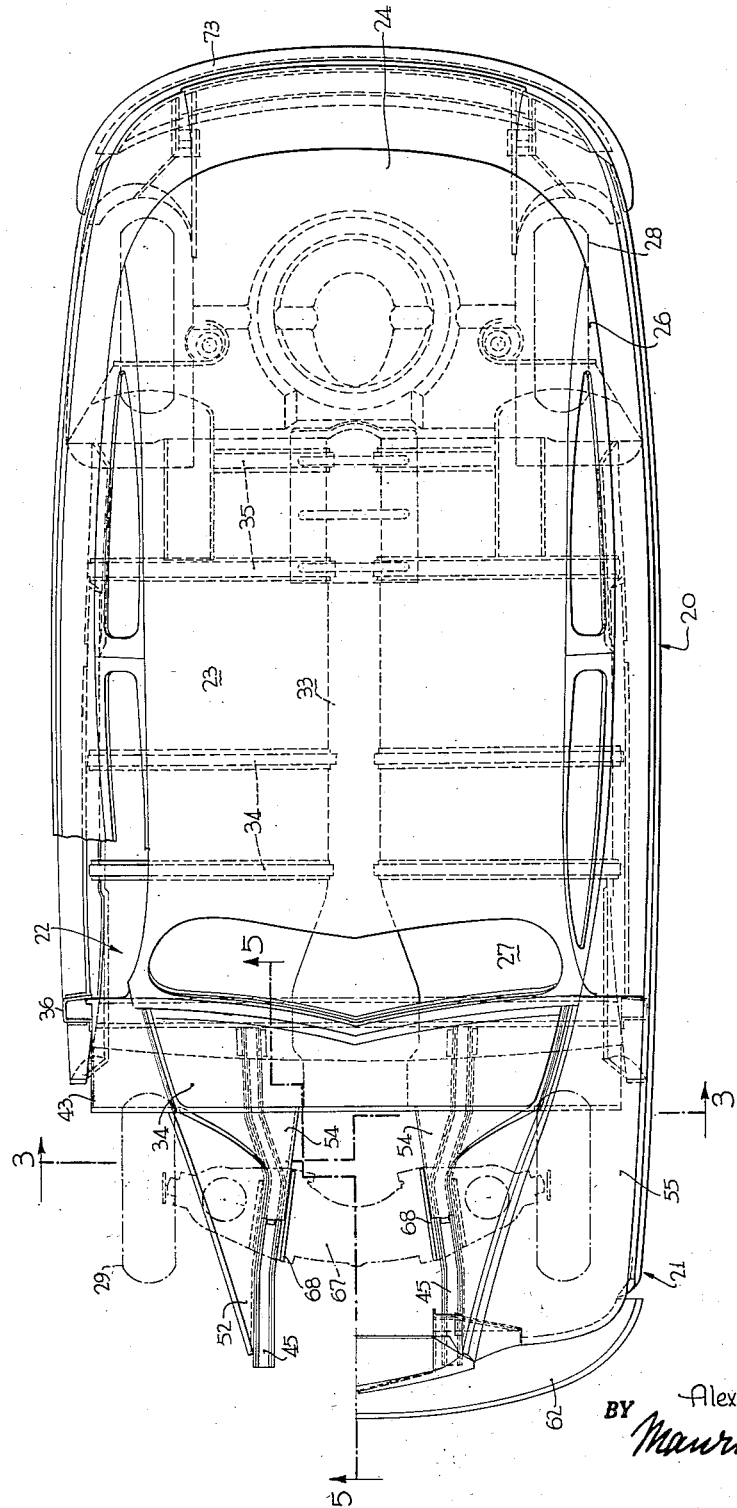
Figure 2 is a partially fragmentary plan view of the same automobile, certain parts being broken away to show the underlying construction.

Figure 14 is a fragmentary section taken along lines 14—14 of Figures 12 and 13; and Figure 15 is a fragmentary front elevation on a larger scale of the wheel supporting brace, certain parts and the adjoining longitudinal sill members being shown in section approximately along line 15—15 of Figure 11.

The automobile illustrated in the drawings is of the private- or pleasure-car type. The body of this car has a main portion or unit 20 and a forward extension 21. The main body portion 20 offers space for passengers and luggage. It has a floor or underframe portion 22, a roof 23 sloping downwardly at 24, a door 25 and a rear quarter panel 26 on each side, and a front wall including the windshield 27. The main body portion 20 is supported in its rear region by the rear wheels 28, while the front portion 21 is supported by the front wheels 29.

Figure 3:
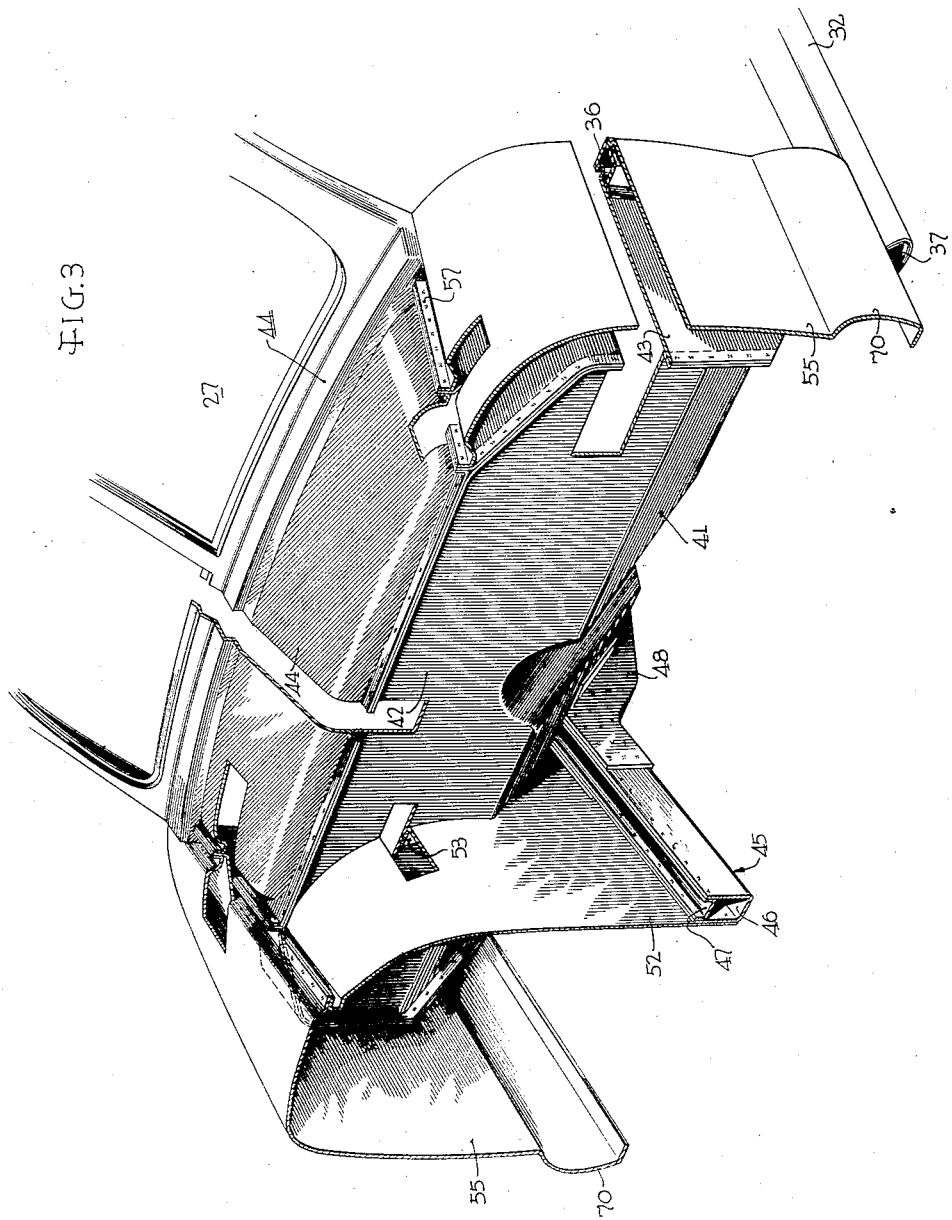
Figure 3 is a fragmentary sectional three-quarter front elevation of the forward portion of the body, the section being taken approximately along line 3—3 of Figure 2, certain parts being omitted and shown in partial sections to reveal details of the construction.
Figure 5:
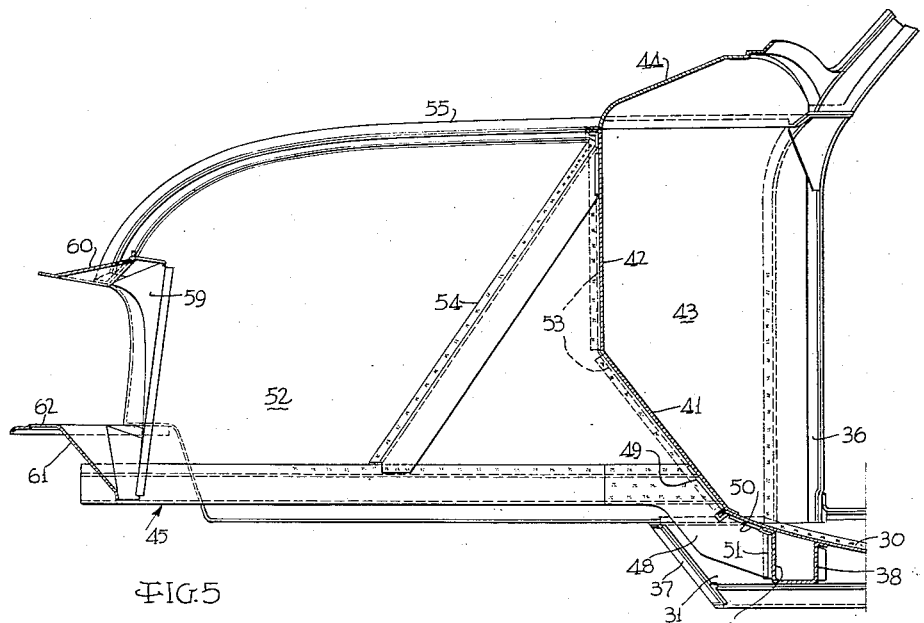
Figure 5 is a fragmentary section through the front end of the body along line 5—5 of Figure 2.

The underframe 22 comprises a floor panel 30 reinforced along its margins by an upstanding web or sill member 31, the latter being connected to an inwardly facing channel section threshold member 32. The usual tunnel 33 for the drive shaft is formed on the floor panel along the middle line of the automobile. Transverse beams 34 and 35 are secured to the floor panel and to the lateral reinforcements 31. The side sills or threshold members 31, 32 extend only a short distance beyond the front posts 36, to the lower ends of which they are firmly connected. The forward ends of the box sectional structures 31, 32 are each closed by a plate 37 (Figures 3 and 5).

In the region of the forward posts 36 a cross beam 38 is secured to the underside of the floor sheet 30 and with its ends to the side sill members 31. The middle portion of this cross beam 38 is upwardly arched to make room for the gear case 39 and nests in the corresponding tunnel portion of the floor panel. The cross beam 38 is of upwardly facing hat section having a front wall 40. The gear case is supported by a short cross member secured to beam 38 on both sides of the tunnel (not shown).

The front margin of the floor panel is secured to the rear margin of a toeboard 41 which merges into the vertical dashboard 42. Inner cowl side panels 43 and the cowl top panel 44 have their respective margins secured to each other and to the top and side margins of toe- and dashboard. The rear margins of the cowl side panels are overlappingly secured to the inwardly facing channel section front posts 36 to form closed box sections therewith.

The construction of the body rearwardly of the cowl may follow well established lines or, in the rear wheel region, it may follow the lines disclosed in and forming the subject matter of applicant's application Serial No. 29,457, now Patent No. 2,662,793, entitled "Rear End Construction of Self-Supporting Automobile Bodies," filed simultaneously with the present application on May 27, 1948. Certain features disclosed here form the subject matter of applicant's co-pending application Serial No. 198,276, now Patent No. 2,689,765 entitled "Sill and Post Structure for Automobile Bodies," filed on November 30, 1950, as a division of the present application.

The body described so far is preferably preassembled as a subassembly unit prior to the attachment of the body portions extending forwardly beyond the dashboard. It will be understood that this unit, which may be called the main body unit, has the same length as a body of corresponding size destined for support by a separate conventional chassis frame. This allows handling of this unit on the assembly lines set up for the customary type of body, that is, no lengthening of the assembly lines and the different stations thereon is required to accommodate the forward body portion of a self-supporting body which serves for the attachment of the front wheels, includes the front wheel housings and serves mostly for the support of the driving unit.

The main body unit consists of sheet metal parts secured together, preferably by means of electric spot welding, as indicated throughout the drawings. The drawings are believed to be self-explanatory in respect to these details.

Forward sill structures or members 45 (Figures 2 to 6) are arranged in inwardly offset relation to the thresholds 31, 32 of the main body portion. Each of these sill structures consists of a deep lower upwardly facing channel section 46 closed by a shallow upwardly facing channel section 47. The rear ends of the sections 46, 47 are connected on each side with a bracket plate 48 having top flanges 49, 50 and a rear flange or tongue 51. These plates 48 form part of the sill members 45. The flanges 49 and 50 are overlappingly secured to the rear marginal portion of the toeboard 41 and the front marginal portion of the floor panel 33, respectively, while the flanges 51 abut and are secured to the front wall 40 of the cross beam 38.

It should be noted that the forward sill members 45 terminate at the front of the forward cross beam 38 of the main body portion without crossing the latter. This connection between the forward sill members 45 and the main body portion, of course, would not sustain the stresses to be transmitted between these two structural units. The necessary strength and stiffness is obtained by use of the members of the forward body portion now to be described.

The lower margin of an inner wheel housing and motor compartment wall 52 is connected with the outside of each sill member 45. These walls 52 have their rear margins shaped in accordance with the toe- and dashboard panels 41, 42 to which they are secured by flange 53. A transverse reinforcing web 54 extends from a mid point of each sill member 45 to the upper marginal region of the dashboard 42, to which its widened upper margin is overlappingly secured. The outer margin of each member 54 follows and is secured by a flange to the inside of the respective panel 52.

Figure 4:
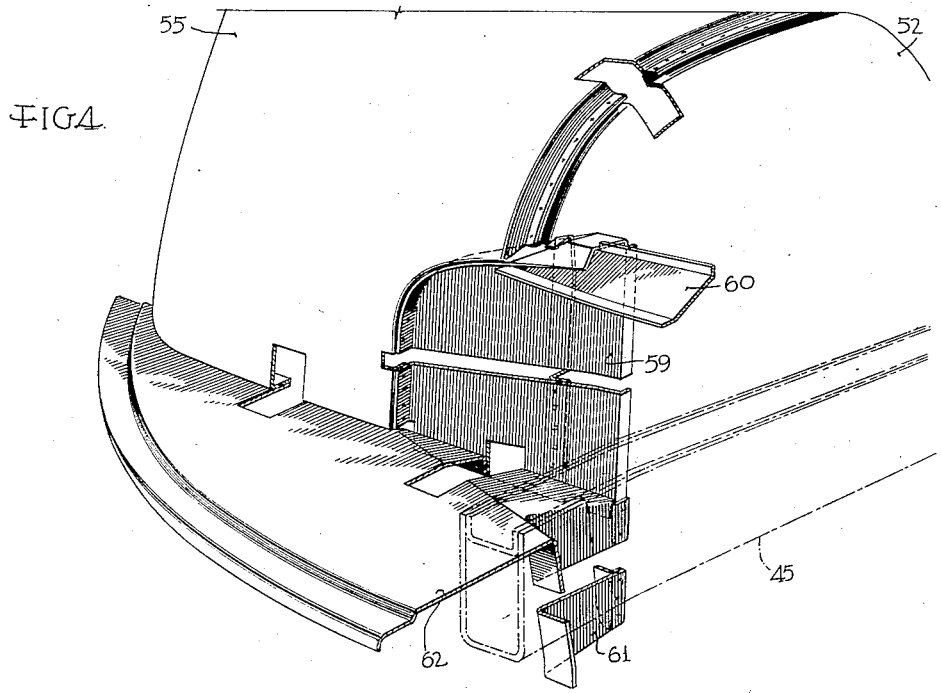
Figure 4 is a fragmentary three-quarter perspective front and side elevation of the right front corner of the construction, here too, certain parts being shown in partial section.
Figure 6:
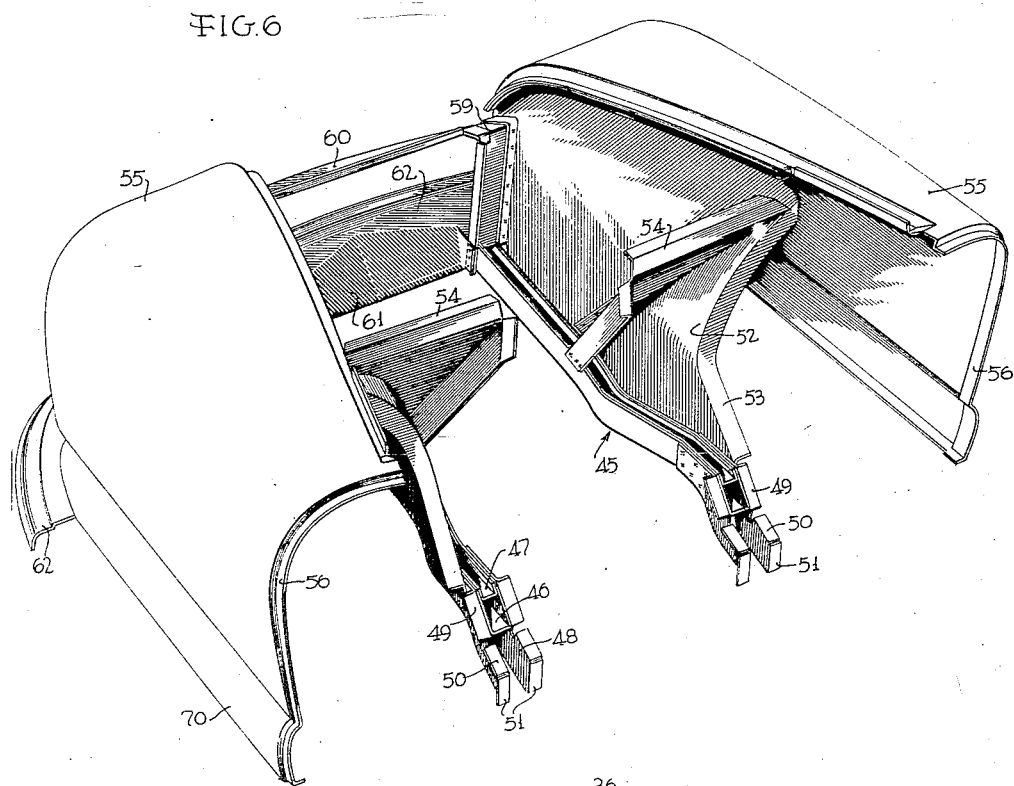
Figure 6 is a perspective three-quarter rear and side view of the forward body extension unit before its attachment to the main body unit.
Figure 7:
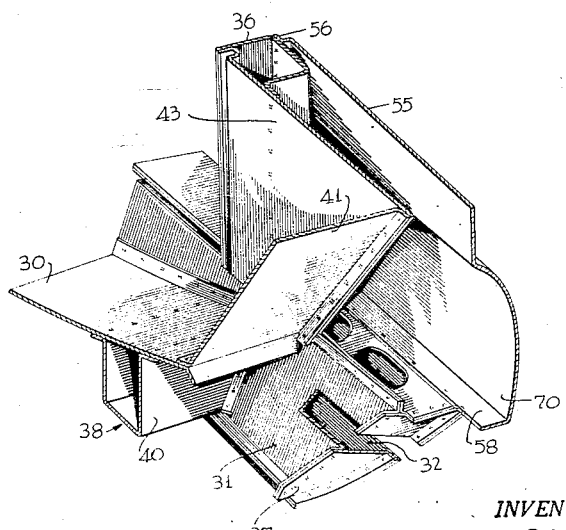
Figure 7 is a fragmentary perspective sectional view of the body members in the region of one of the forward posts, this view showing from the inside the same body portions shown from the outside at the lower righthand corner of Figure 3.

Fender stampings 55 have their inner margins secured to the top margins of the stampings 52. These fenders 55 extend rearwardly to the front posts 36, to which they are secured by their rear inwardly offset margins 56. The rearward portions of the fenders 55 are secured at the top by flanges 57 (Figure 3) to the joinder between the cowl sides and tops 43, 44 and at the bottom by flange 58 (Figure 7) to the forward portion of the threshold member 32 where it extends beyond the front post 36. The complementary wheel housing and fender members 52, 55 have their front ends further interconnected on each side by a baffle plate 59 (Figures 4 to 6). Each of the structures 45, 52, 54, 55 and 59 may be preassembled as a subassembly unit to be connected in final assembly with the main body unit.

The two lateral structures 45, 52, 54, 55 and 59 are interconnected at the front end by additional members, to wit: a top baffle plate 60 (Figures 4 to 6) and a bottom baffle plate 61 which is combined with a stone shield 62 inserted between body front end and front bumper 63. The radiator 64 may be carried by the lateral baffle plates 59. The radiator grille is designated 65, and the hood 66, the latter fitting with its longitudinal margins into the recesses formed in the fenders at their joinder with the wheel housing members 52 and the cowl. As customary, the bumper is carried by the front ends of the sill members 45.

Instead of securing the individual sill and wheel housing structures 45, 52, 54, 55 and 59 to the main body unit separately as mentioned above, the two wheel housing structures may be preassembled into the complete unit shown in Figure 6 and then connected with the main body unit.

The entire front end structure likewise consists of sheet metal parts integrally connected with each other, and in final assembly with the main body unit, preferably by electric spot welding.

The forward sill structures 45 are connected in any convenient or known manner to a transverse axle or wheel carrying beam 67. Preferably, this beam has formed thereon longitudinally extending upwardly facing channel sectons 68 which telescope from beneath over the structures 45 and are secured to them by means of bolts with the interposition of vibration absorbing rubber bushings (not shown). The beam 68 also constitutes the front support for the motor unit 69.

It is apparent that the stresses to be taken up by the sill members 45 are transmitted into a large area of the front of the main body unit by means of the members 52, 54 and 55, so that the connection proper between the sill members 45 and the main body unit, in spite of its inherent above indicated weakness, is amply strong to carry its small share of the total stresses. Each wheel housing structure presents a hollow downwardly open beam closed at the rear by dashboard, toeboard and cowl.

The front fenders 55 have their lower horizontal margins at the same level as the lower margin of the front bumper 63, and they are provided adjacent the lower margin with an outwardly projecting beading 70 arranged in continuation of the bumper 63. This beading is rearwardly further continued by corresponding beadings 71, 72 along the lower margins of the doors 25 and the rear quarter panels 26, and the beadings 72 are continued by the rear bumper 73.

The outer surface of the sill member 32 is inwardly offset with respect to the lower margins of said beadings 71, 72 so that the car gives the impression of being defined at the bottom by the bumpers 63, 73 and said continuous beadings 70, 71 and 72. This inward offsetting also has further advantages. It permits the attachment of the rear quarter panel to the sill by an inwardly directed flange 74 of the panel 26, an attachment which does not require accurate fairing in of panel and outer sill surface. Likewise, the lower margin of the door need not be faired in the outer surface of the sill member 32. This fairing in of adjoining separate body panels is a rather tedious and expensive job, especially in modern bodies with their very slightly curved surfaces. Consequently, the elimination of the necessity for fairing panels in along one or more margins spells a substantial saving.

In the illustrated embodiment, the floor panel 30 is downwardly offset with respect to the top of the side sill or threshold structure 31, 32 so that passengers would have to step over the threshold when entering or leaving the car. This stepping over is facilitated and the largest possible unobstructed floor space is obtained by the arrangement of threshold or side sill beneath the door.

The ends of the sills 31, 32 may be covered by ornamental, e. g., chromium plated, shoes 75.

The structure of the embodiment illustrated in Figures 10 to 15 has a floor panel 99 forwardly extended by a toeboard 100 and a dashboard 101. The sides of the floor panel 99 are reinforced by thresholds or side sills 102 having an inner web 103 and an outer panel member 104. The thresholds 102 terminate in the region of front door posts 105 which have their lower ends secured to them. The posts 105 are of forwardly facing channel form and each has its outer wall secured to the cowl side wall 106 and its inner wall to an inner cowl brace 107. Toeboard 100 and dashboard 101 are secured along and near their lateral margins, respectively, to the forward margins of the members 106 and 107.

A transverse beam 108 of upwardly facing hat section is secured to the underside of the floor panel 99 at a distance rearwardly of the floor panel's front margin and the location of the posts 105. This rearward offsetting of the cross members behind the posts permits the installation of a motor and gear unit extending rearwardly beyond the post location. For firmly tying the cross brace 108 into the side sills 102 and the lower ends of the posts 105, the cross brace 108 has its ends widened by the provision of diagonal U-section members 109 which extend from points of the cross member inwardly spaced from the side sills to points of the side sills arranged approximately in line with the front margin of the posts 105.

Front sill structures 110 are inwardly spaced from the side sills 102 and have their rear ends secured to the cross members 108 and the top of their rear ends secured to the underside of the floor panel 99 in front of the members 108. The construction of these sills 110 is similar to the construction of the sill members 45 of the first embodiment, except that the upper portions of the side walls of the members forming the sills are turned laterally for overlapping connection with the underside of the floor panel, as clearly shown in the drawing (Figure 11).

Also in this embodiment, the front sill members 110 are braced against the main portion of the body by inclined braces 111 and the inner wheel housing walls 112.

The rear supporting member 113 for the motor and gear unit is not arranged under the members 108 but is secured to the sill members 110 at a location forwardly spaced from the members 108. This, in combination with the rearward arrangement of the brace 108, permits the convenient arrangement of the supports for the motor and gear unit.

The front end of the motor unit is supported on a transverse beam 114 which also is provided with the attachment means (not shown) for the front wheels 115. This cross beam 114 may be of substantially conventional shape except that its top is recessed near each end and reinforced by an upwardly facing channel 116 which telescopes over the respective sill 110 and is secured thereto by bolts and rubber bushings in a similar manner as described for the first embodiment. The recessing of the member 116 into the transverse beam 114 allows a relatively low arrangement of the sill members 110 without a sharp offset at its intersection with the beam 114.

The fenders for the front wheels may be fixedly or removably secured to the structure described and they may overlap the sides of the cowl. The holes 117 shown in Figure 13 are provided for the removable attachment of the rear end of such fender.

Except for the special features of the construction shown in Figures 10 to 15, as described above, this construction functions in substantially the same manner as the construction of the first embodiments.

The drawings indicate clearly, as mentioned hereinbefore, that the illustrated structures consist of sheet metal stampings and that the component sheet metal parts are overlappingly secured to each other by electric spot welding. Also, it is apparent that the margins of the different parts are flanged for this purpose. It is believed not necessary to describe in detail each of these overlapping connections and each of the flanges. While certain parts are described for or shown on only one side of the longitudinal middle line of the body, the body, in most places, is symmetrical to the middle line; consequently, showing and describing both sides would serve no useful purpose.

The invention is not restricted to the details of the three embodiments illustrated and described, but is subject to other modifications and to adaptations for specific purposes. Such modifications and adaptations will easily occur to those skilled in the art. For example, the invention and especially certain features thereof, under certain conditions, may be employed at the rear end of the body, especially for automobiles having the motor located at the rear.

What is claimed is:

1. In a self-supporting sheet metal body for automobiles, a main body portion having front posts secured by their lower ends to the front end portions of bottom side sills, a cowl having its rear side margins secured to said posts, having a dashboard, a toeboard, and a floor board secured to the forward and the lower side margins of said cowl and to said sills, and having a cross beam secured to the underside of said floor board and interconnecting the front end portions of said sills; a forward body extension having sill members inwardly spaced from the respective sill and adapted for connection with front wheel supporting means, the rear ends of said sill members terminating at and being secured to the front of said cross beam, the rear end portions of said sill members adjacent said cross beam being angled off in side elevation relative to their front portions and being overlappingly secured in front of said cross beam to the underside of said toeboard and floor board, bracing means interposed between said sill members and above the latter to the front of said main body portion.

2. In a self-supporting automobile body, side sills extending rearwardly from points adjacent the rear of front wheel locations, front posts connected to the forward portions of said sills, a cross beam interconnecting said sills rearwardly of the location of said posts, bracing means connecting on each side of the body a region of said beam spaced from the respective sill and from the middle of the beam with the region of the sill in front of said beam, a pair of sill members spaced from each other inwardly offset with respect to said side sills and extending forwardly from said cross beam to which they are secured, and means bracing the forward portions of said sill members against the middle part of the body above the side sills.

References Cited in the file of this patent

UNITED STATES PATENTS

| Number | Name | Date |
|---|---|---|
| D. 124,784 | Sopchick | Jan. 21, 1941 |
| 1,525,936 | Heintz | Feb. 10, 1925 |
| 2,074,158 | Avery | Mar. 16, 1937 |
| 2,128,930 | Fageol et al. | Sept. 6, 1938 |
| 2,139,750 | Hicks | Dec. 13, 1938 |
| 2,167,664 | Matthews | Aug. 1, 1939 |
| 2,225,976 | Caldwallader | Dec. 24, 1940 |
| 2,234,221 | Avery et al. | Mar. 11, 1941 |
| 2,248,319 | Waterhouse | July 8, 1941 |
| 2,289,395 | Ulrich | July 14, 1942 |
| 2,357,043 | Ledwinka et al. | Aug. 29, 1944 |
| 2,383,029 | Ulrich | Aug. 21, 1945 |
| 2,383,428 | Ulrich | Aug. 21, 1945 |
| 2,405,260 | Ledwinka et al. | Aug. 6, 1946 |
| 2,488,471 | Kramer et al. | Nov. 15, 1949 |
| 2,525,339 | Chausson | Oct. 10, 1950 |
| 2,539,050 | Begg | Jan. 23, 1951 |
| 2,588,643 | Maxwell | Mar. 11, 1952 |

FOREIGN PATENTS

| Number | Country | Date |
|---|---|---|
| 773,590 | France | Sept. 3, 1934 |
| 548,589 | Germany | Apr. 14, 1932 |
| 601,189 | Germany | Aug. 10, 1934 |

OTHER REFERENCES

Illustration Planche 799, in "Auto-Carrosserie," No. 128, March-April 1937, 11843.